United States Patent [19]

Walz et al.

[11] Patent Number: 4,806,677

[45] Date of Patent: Feb. 21, 1989

[54] HARDENING COMPONENT FOR SYNTHETIC RESINS WHICH CONTAIN GROUPS WHICH ARE CAPABLE OF FORMING AMIDES OR ESTERS WITH CARBOXYLIC ACIDS

[75] Inventors: Gerd Walz, Wiesbaden; Helmut Plum, Taunusstein, both of Fed. Rep. of Germany

[73] Assignee: Hoechst AG, Fed. Rep. of Germany

[21] Appl. No.: 8,286

[22] Filed: Jan. 29, 1987

[30] Foreign Application Priority Data

Jan. 31, 1986 [DE] Fed. Rep. of Germany ....... 3602981

[51] Int. Cl.$^4$ .............................................. C07C 69/00
[52] U.S. Cl. .................................... 560/125; 528/119; 560/144; 560/169
[58] Field of Search .................. 528/75, 119; 560/169, 560/171, 144, 125

[56] References Cited

U.S. PATENT DOCUMENTS 4,694,036  2/1987  Walz et al. ............................ 525/386
4,734,520  3/1988  Plum et al. ............................ 560/169

FOREIGN PATENT DOCUMENTS 3229047  2/1984  Fed. Rep. of Germany ........ 525/75
3417441  11/1985  Fed. Rep. of Germany .
58-198571  11/1983  Japan ..................................... 528/75
933667  6/1982  U.S.S.R. ................................. 528/75

*Primary Examiner*—Allan M. Lieberman
*Attorney, Agent, or Firm*—Bierman & Muserlian

[57] ABSTRACT

Hardeners are described for synthetic resins which contain groups which are capable of ester or amide formation and, if appropriate, polymerizable double bonds. The new hardeners, which allow lower cross-linking temperatures, are products (A) of the Michael addition of compounds (B), containing Michael addition-capable ester groups, to compounds (C) which contain at least two Michael addition-capable double bonds, the products (A) having an average of at least one polymerization-capable double bond and at least two transesterification- or transamidation-capable ester groups per molecule and the compound (B) representing products of the reaction of (b1) CH-active alkyl esters and (b2) polyisocyanates.

18 Claims, No Drawings

HARDENING COMPONENT FOR SYNTHETIC RESINS WHICH CONTAIN GROUPS WHICH ARE CAPABLE OF FORMING AMIDES OR ESTERS WITH CARBOXYLIC ACIDS

DESCRIPTION

German Offenlegungsschrift No. 3,417,441 relates to hardeners for synthetic resins which contain groups which are capable of forming amides and/or esters with carboxylic acids. These hardeners are products of the Michael addition of Michael addition-capable mono- or dicarboxylic acid esters to compounds which contain at least one Michael addition-capable double bond. On average, they contain at least two transesterification- or transamidation-capable ester groups per molecule.

These hardeners are distinguished by the fact that they react, at relatively low temperatures of about 160° C., with synthetic resins which are capable of ester or amide formation, with crosslinking, the cleavage products produced during this not being very polluting, above all when the transesterification- or transamidation-capable ester groups contain lower alcohols, particularly ethanol, as alcohol components.

Although the known products have proven successful, there is great interest in further reducing the crosslinking temperature without impairing the properties of the coatings.

The invention therefore relates to a hardening component for synthetic resins which contain groups which are capable of forming esters and/or amides with carboxylic acids, the hardening component comprising the product (A) of the Michael addition of a compound (B), containing Michael addition-capable ester groups, to a compound (C) which contains at least two Michael addition-capable double bonds, wherein the product (A) contains an average of at least one polymerization-capable double bond and at least two transesterification- or transamidation-capable ester groups per molecule and wherein the compound (B) represents a product of the reaction of (b1) CH-active alkyl esters and (b2) polyisocyanates.

The compounds (C) are basically all $\alpha,\beta$-unsaturated oxo compounds which contain at least two double bonds. The ester, amide and urea derivatives of $\alpha,\beta$-unsaturated mono- and/or dicarboxylic acids generally having 2 to 10, preferably 3 to 6 C atoms, such as cinnamic acid, crotonic acid, citraconic acid, sorbic acid, particularly acrylic acid, methacrylic acid, dimethylacrylic acid, crotonic acid, maleic acid and fumaric acid, are preferably used according to the invention as Michael addition-capable compounds containing double bonds. According to an embodiment of the invention, esters formed from an $\alpha,\beta$-olefinically unsaturated mono- or dicarboxylic acid and a polyol which preferably has 2 to 4 hydroxyl groups are employed. Examples of polyols are ethylene glycol, the various propylene and butylene glycols, neopentyl glycol, hexanediol, octanediol, glycerol, trimethylolpropane, hexanetriol, pentaerythrite, sorbitol and polyglycol ethers such as diethylene or dipropylene glycol, in each case individually or in a mixture. Examples of polyamines for corresponding amines are alkylenediamines and oligomers thereof, such as ethylenediamine, propylenediamine and butylenediamine, diethylenetriamine and tetramines, and higher homologs of these amines, and furthermore aminoalcohols, such as diethanolamine or the like.

In particular, the esters of the $\alpha,\beta$-olefinically unsaturated acid can be selected from the group comprising the alkanediol diacrylates or dimethacrylates, trimethylolpropane triacrylate or trimethacrylate and pentaerythrite tetraacrylate or tetramethacrylate. These esters are easily accessible commercial products.

A group of hardening components which favorably influences in particular, the adhesion of coating films, hardened with the latter, to steel sheets and the adhesion of polyvinyl chloride-based coatings to the hardened coating film covers Michael addition products (A) which contain, as compound (C), substituted urethanes or ureas of the general formula $$(Ac-E-D)_m-X_m \qquad (I)$$

in which the individual symbols have the following meaning $X_m$ is the m-valent radical $R(NHCO)_m$ of a multifunctional isocyanate, where R represents an m-valent hydrocarbon radical, preferably an aliphatic, cycloaliphatic or aromatic radical, which may optionally be interrupted by heteroatoms (O, NH), m is an integer of at least 2, preferably 2–10 and particularly 2 or 3, Ac is the acyl radical of an $\alpha,\beta$-unsaturated mono- or dicarboxylic acid, E is an amido group or an oxygen atom, D is an aminoalkylene, an aminocycloalkylene, an O-alkylene or an O-cycloalkylene radical having 2 to 25, preferably 2 to 8, carbon atoms.

In an advantageous modification of the compound C) described above according to the formula (I), D is a radical of the formula

where R' is a branched alkyl radical, in the $\alpha$-position to the carboxyl group, having 9–11 carbon atoms, and E in the formula (I) is an oxygen atom.

Coating films which contain compounds having radicals of the formula (II) specified above have much less tendency towards dimple formation during baking and have favorable anticorrosion properties.

Compounds (C), according to the invention, which contain the glycerol ester of a carboxylic acid, branched in the $\alpha$-position, having 9–11 carbon atoms as part of the molecule (see above formula (II)) are obtained, for example, by pre-paring an unsaturated mixed ester from an $\alpha,\beta$-unsaturated monocarboxylic acid, a corresponding dicarboxylic acid or anhydride thereof, and a diol and the glycidyl ester of a carboxylic acid, branched in the $\alpha$-position, having 9–11 carbon atoms.

In a further advantageous modification of the hardening component according to the formula (I), the symbol D is a radical which is derived from a 1,2-diol, and E is an oxygen atom. The corresponding starting compound Ac—A—OH is obtained, for example, by reaction of a 1,2-alkene oxide with an $\alpha,\beta$- olefinically unsaturated mono- or dicarboxylic acid. With increasing chain length of 1,2-diol, hardening components are obtained which give softer coating films during the electrophoretic deposition, whereby it is possible to achieve thicker coatings. In general, it is sufficient for only part of the hardening components to comprise such a softening compound. Hardening components in which D in the formula (I) has the structure O(CH$_2$)$_y$O—CO—(CH$_2$)$_z$, E is an oxygen atom, y is an integer from 1 to 4, preferably 2, and z is an integer from 5 to 20, preferably 5–10, exhibit a similar action. The corresponding starting compound Ac—O(CH$_2$)$_y$—OOC—(CH$_2$)$_z$OH is obtained, for example, by addition of a hydroxyalkyl ester of an olefinically unsaturated carboxylic acid to a lactone. The product of the reaction of hydroxyethyl acrylate and ε-caprolactone is a typical, commercially available representative of this class of compounds.

A further class of hardening components according to the invention are the Michael addition products (A) which contain, as component (C), amides of α,β-olefinically unsaturated mono- or dicarboxylic acids of the general formula $$R''(NH-Ac)_p \quad (III)$$

in which R'' is the radical of a p-valent amine, Ac is the acyl radical of an α,β-olefinically unsaturated mono- or dicarboxylic acid, and p is an integer from 2–10, preferably 2 or 3, for example methylene bisacrylamide, toluylene bisacrylamide, hexamethylene bisacrylamide or isophorone bisacrylamide.

The Michael addition-capable compounds (B) are products of the reaction of (b1) CH-active alkyl esters and (b2) polyisocyanates.

The substances which are available on a large industrial scale, such as toluylene diisocyanate, hexamethylene diisocyanate and isophorone diisocyanate (IPDI), are preferably used as polyisocyanates (b2). The compounds which are known from polyurethane chemistry, including the corresponding prepolymers, are furthermore suitable for this. Examples of such polyisocyanates are the aliphatic trimethylene, tetramethylene, pentamethylene, 1,2-propylene, 1,2-butylene, 2,3-butylene, 1,3-butylene, ethylidene and butylidene isocyanates, 2,2,4-trimethylhexamethylene diisocyanate, 1,12-dodecane diisocyanate, dicycloalkylene diisocyanates such as 1,3-cyclopentane diisocyanate, 1,4-cyclopentane diisocyanate and 1,2-, 1,3- and 1,4-cyclohexane diisocyanate; furthermore diisocyanates of dimeric acids, aromatic diisocyanates, such as 1,3-phenylene diisocyanate, 1,4-phenylene diisocyanate, 4,4'-diphenyl diisocyanate, 1,5-naphthalene diisocyanate and 1,4-naphthalene diisocyanate, the aliphatic-aromatic diisocyanates, such as 4,4'-diphenylenemethane diisocyanate, 4,4'-toluidine diisocyanate and 1,4-xylilene diisocyanate, naphthalene 1,5-diisocyanate, nuclear-substituted aromatic isocyanates, such as dianisidine diisocyanate, 4,4'-diphenyl ether diisocyanate and chlorodiphenylene diisocyanate, diphenylmethane 2,4'- and/or 4,4'-diisocyanate, 3,2'- or 3,4-diisocyanato-4-methyldiphenylmethane, the triisocyanates, such as triphenylmethane 4,4',4''-triisocyanate, benzene 1,3,5-triisocyanate and toluene 2,4,6-triisocyanate, and the tetraisocyanates, such as 4,4'-diphenyldimethyldimethane 2,2',5,5'-tetraisocyanate, or mixtures of these compounds.

Besides these simple polyisocyanates, those are also suitable which contain heteroatoms in the radical linking the isocyanate groups. Examples of these are polyisocyanates which incorporate carbodiimide groups, allophanate groups, isocyanurate groups, urethane groups, acylated urea groups and biuret groups.

Suitable polyisocyanates are also the known, terminal isocyanate group-containing prepolymers, as are accessible, in particular, by reaction of the abovementioned simple polyisocyanates, above all diisocyanates, with substoichiometric quantities of organic compounds having at least two groups which are reactive towards isocyanate groups. As such, compounds are used, in particular, which incorporate a total of at least two amino groups and/or hydroxyl groups.

Suitable CH-active alkyl esters (b1) are compounds of the general formula

$$X-CH_2-CO_2R \quad (IV)$$

where X=—CO$_2$R, —CN or —CH$_3$CO—, and R denotes an alkyl radical having 1 to 8, preferably 1 to 6, C atoms. In particular, methyl, ethyl and butyl cyanoacetates and dimethyl and diethyl malonates are employed. It may be advantageous for R to be a branched alkyl radical, particularly 2-ethylhexyl, since the tendency of a coating film towards dimpling on baking can be counteracted by this in many cases. The methyl and ethyl esters give particularly low baking temperatures and low molecular weight cleavage products, which are, in addition, particularly safe.

The hardening components (B) and (C) according to the invention are prepared by methods which are known per se. The reaction between the polyisocyanate (b2) and the CH-active alkyl ester (b1) for production of the component (B) is preferably carried out here in the presence of solvents, such as ethyl acetate, butyl acetate, toluene, methyl ethyl ketone, ethylene glycol dimethyl ether etc, which contain no active hydrogen atoms and which are inert towards isocyanates. However, the reaction may also be carried out without solvent. The reaction is preferably carried out under a nitrogen atmosphere with exclusion of moisture. Sodium or, preferably, sodium phenolate, which is employed in an amount of 0.1–0.5% by weight, relative to the total weight of the reaction components, serves as catalyst. The polyisocyanate and the CH-active alkyl ester are preferably used in an amount such that at least 1 mole of CH-active alkyl ester is present per isocyanate group. An excess of 10–50% of CH-active alkyl ester may alternatively be employed.

Compounds (C) which contain urethane or urea groups and which correspond to the formula (I) are obtained by reaction of hydroxy esters, hydroxy amides, amides, aminoesters or aminoamides of α,β-olefinically unsaturated acids with isocyanates. The compounds described above, above all, may be employed here as isocyanates. The formation of the urea or urethane here generally proceeds at moderate temperatures and may be accelerated by known catalysts, for example dibutyltin dilaurate. If the reaction is to be carried out in a solvent, a solvent, as described above, which is inert towards isocyanates is selected. A water-soluble solvent, such as diethylene glycol dimethyl ether, acetone or methyl ethyl ketone or methyl isobutyl ketone, is preferably selected for the preparation of hardening components which are to be employed in aqueous systems. Compounds (C) which contain amido groups are produced when the free α,β- olefinically unsaturated acid is employed in place of an ester or amide. In this case, the corresponding amide forms directly, with decarboxylation, from the acid and the isocyanate.

In principle, the Michael addition of (B) to (C) generally proceeds at room temperature. It may be accelerated by increasing the temperature and by addition of catalysts. Suitable catalysts are, for example, basic compounds, such as alkali metal hydroxides, alkali metal alcoholates and basic amine compounds. Besides these, suitable catalysts are other compounds such as are described in German Patent Application No. P 3,541,140.6. The quantity of catalyst is generally 0.01 to 5, preferably 0.02–2, % by weight, relative to the total weight of the reaction components. The $\alpha,\beta$-unsaturated oxo compound (C) and the Michael addition-capable product (B) from the reaction of CH-active alkyl esters of (b1) and polyisocyanate (b2) are employed in quantities such that at least one CH-active alkyl ester group is present per mole of oxo compound. The molecular weight and, in general, the functionalities of the hardeners with respect to transesterification- or transamidation-capable ester groups increase by increasing the proportion of the reaction product (B), whereas the number of polymeric double bonds naturally decreases.

The hardening components (B) and (C) according to the invention are represented in the present description as unitary chemical individuals. In practice, statistical mixtures are frequently produced as a result of the multifunctionality of the starting materials. This does not affect the usability as hardener according to the invention.

The hardeners (A) according to the invention may be used in two-component coatings together with a synthetic resin (binder) which is capable of forming amides and/or esters with carboxylic acids. Synthetic resins which additionally contain polymerizable double bonds are also suitable. These synthetic resins are compounds, known per se, having molecular weights (average numbers) of about 300 to about 20,000, which preferably contain hydroxyl groups and/or amino groups, particularly primary and/or secondary amino groups. These are, for example, hardenable polyols (polyester polyols, polyether polyols, polyurea polyols, polyol-containing acrylic resins and the like) as are described for example, in German Offenlegungsschrift No. 3,124,784. Phenol, urea and melamine resins are furthermore suitable here. Resins containing hydroxyl and/or amino groups are produced, for example, by using hydroxyesters and/or aminoesters of olefinically unsaturated acids, such as aminoalkyl acrylates or hydroxyalkyl acrylates or corresponding methacrylates, as comonomers. A further group are the polyaminopolyamides which can be obtained from dimerized fatty acids and polyamines. Aminopolyether polyols are obtained, for example, by reaction of epoxy resins, formed from polyphenols and epihalohydrins, with primary and/or secondary amines. Synthetic resins which contain carboxylic acid or amino groups can frequently be made water-soluble by means of bases or acids, and be deposited anodically or cathodically from such solutions. Due to their hydrolysis stability, the hardening components according to the invention are particularly suitable as a component of such electro-coating materials. Particularly good results are obtained using cationic aminopolyether polyols.

The amino equivalent weight of these synthetic resins is expediently 150 to 3000, preferably 500 to 2000. The hydroxyl equivalent weight, if these synthetic resins contain OH groups, is generally between 150 and 1000, preferably 200 and 500.

The hardening components (A) according to the invention are used, as mentioned, above all in electrocoating materials. Besides this, they may also be used in coating preparations which are applied to the substrate by other methods, such as brushing, rinsing, dipping, etc.

In order to prepare cathodically depositable preparations, the amino group-containing synthetic resins and hardeners, present in organic solvents, are mixed and the amino groups are neutralized, completely or partially, by reaction with a water-soluble acid, for example formic acid, acetic acid, lactic acid, phosphoric acid, etc, before being diluted with water. The amount of acid in the individual case depends on the properties of the resin used and is generally only carried out until the resin is solubilized or dispersed.

Aqueous preparations which have a particularly low content of volatile, organic solvents are obtained, as described in German Patent Application No. P 3,602,980.7, by removal of the solvent contained in the binder from the preparation or solution. This step is preferably carried out under reduced pressure.

Various additives, such as pigments, pigment pastes, antioxidants, surfactants, solvents, leveling and thickening agents, reactive thinners etc, may also be added, if appropriate, to the coating preparations. These additives are known and are conventionally employed in the coatings industry. The electrical deposition of the coating particles is carried out by known processes, to which reference is made here. The deposition may be carried out on all electrically conducting substrates, for example metal, such as steel, copper, aluminum and the like.

The synthetic resins are hardened by transamidation and/or transesterification using the ester groups, introduced by Michael addition, and by crosslinking reactions of the polymerizable double bonds at elevated temperature, the temperature necessary being dependent on the alcohol component of these esters and being the lower the lower the molecular weight of the alcohol component. Particularly low hardening temperatures are thus obtained using the methyl and ethyl esters. The hardening temperatures can be reduced to about 120° C. by adding catalysts which accelerate the transesterification or transamidation. Higher temperatures up to about 250° C. are possible.

Suitable catalyst for the hardening are, for example, metal salts of organic acids, particularly zinc, lead, iron or chromium octoate or napthenate. The catalysts also accelerate the crosslinking reactions of the double bonds contained in the hardener molecule. The amount of these catalysts is generally between 0 and 10% by weight, preferably between 0.3 and 3.0% by weight, calculated as the amount by weight of metal and relative to the total weight of synthetic resin and hardener.

The synthetic resins and hardeners are generally mixed in ratios such that the ratio of the sum of moles of groups which are capable of ester and amide formation in the synthetic resin to the sum of the moles of double bonds and transesterification- and transamidation-capable groups in the hardener is 0.1–10, preferably 0.3–3.

In the following examples, parts (P) are parts by weight and percent (%) are percent by weight.

EXAMPLES

Example 1

(1a) Preparation of the hardener (Michael addition product A))

Precursor 1.1 (reaction product B)): 111 P of 3-isocyanatomethyl-3,5,5-trimethylcyclohexyl isocyanate are introduced continuously over one hour into a mixture of 132 P of dimethyl malonate and 0.73 P of sodium phenolate at 65° C. The temperature was maintained at 65° C. until the isocyanate content was 0.5%, whereupon the reaction batch was diluted with 60.8 P of propylene glycol monomethyl ether.

Precursor 1.2 (compound C): 5089.5 P of hydroxyethyl acrylate, 39 P of acrylic acid, 5.4 P of hydroquinone monomethyl ether and 10.8 P of tin-II octoate were initially introduced and heated to 130° C. 283 P of the glycidyl ester of a saturated fatty acid, branched in the α-position, having 9-11 C atoms and an epoxide equivalent weight of 245 were subsequently metered in continuously over 2 hours and the batch was maintained at 130° C. until the acid index was <1. After addition of 9.3 P of zinc acetylacetonate and 21.2 P of hydroquinone monomethyl ether, 4008.8 P of ®Desmodur T 80 (Bayer AG) were metered in at 60° C. at a rate such that the temperature did not exceed 65° C. The batch was subsequently kept at 60° C. until the content of NCO groups was <0.5%. 21.2 P of hydroquinone monomethyl ether were added in each case when half the Desmodur T 80 had been added and when it had all been added, and at the end of the reaction. The batch was diluted with 1800 P of propylene glycol monomethyl ether.

Hardener 1.3 (compound A): 12.6 P of triphenyl phosphine (93% purity) were added to the 2992.5 P of the precursor 1.2 at 60° C. and 2126.2 P of the precursor 1.1 were subsequently metered in at a rate such that a temperature of 65° C. was not exceeded. When the addition was complete, the temperature was kept at 60° C. until the content of C=C double bonds was 2.75%. 77.2 P of formic acid (50% strength in propylene glycol monomethyl ether) were then added and the mixture was diluted with propylene glycol monomethyl ether until the solids content was 75%.

(1b) Preparation of the binder (synthetic resin having groups which are capable of ester formation)

According to known methods, an aminopolyether polyol was prepared from 65.5% of a bisphenol A epoxy resin ester having an epoxide equivalent weight of 480, 18.8% of a polyester based on trimethylolpropane, adipic acid, isononanoic acid and tetrahydrophthalic anhydride having an acid index of 65 mg of KOH/g and a hydroxyl index of 310 mg of KOH/g, 6.1% of diethanolamine, 4.4% of 2-ethylhexylamine and 5.2% of diethylaminopropylamine. The product had an amine index of 96 mg of KOH/g and was dissolved in propylene glycol monomethyl ether to form a 65% solution.

(1c) Electrocating and testing 2.5 P of lead silicate, 13 P of $TiO_2$, 2.5 P of carbon black and 13 P of aluminum silicate as filler were added to 54 P of a 65% solution of the binder 1b, and the mixture was comminuted in a three-roll mill. A further 54 P of the 65% solution of the binder 1b, 40 P of the 75% strength hardener 1a, 2.8 P of lead octoate and 7.6 P of 5N formic acid were then added. The batch was homogenized using a stirrer at high speed and diluted with demineralized water until the solids content was 20%. The coating bath was stirred for 24 hours and then had the following characteristics: pH: 5.8, conductivity: 1360 $\mu Scm^{-1}$, meq value: 38. A smooth coating having a film thickness of 17 $\mu m$, a solvent resistance of more than 100 double strokes with methyl isobutyl ketone and which produced a value of 80 cm in a Niessen reverse impact test was obtained on phosphate steel sheet, connected as the cathode, with maintenance of the following conditions: deposition at a bath temperature of 30° C. for 2 minutes at 300 volts and hardening (30 minutes, 120° C.).

EXAMPLE 2

(2a) Preparation of the hardener (Michael addition product A)

Precursor 2.1 (reaction product B): 1000 P of trimethylhexamethylene diisocyanate were introduced continuously over 1 hour into a mixture of 1257.1 P of dimethyl malonate and 6.8 P of sodium phenolate at 65° C. The reaction was slightly exothermic. The reaction was continued at 65° C. until the isocyanate content was <0.5%, and the batch was then diluted with 564 P of propylene glycol monomethyl ether.

Precursor 2.2 (compound C): the same product was employed for this as precursor 1.2.

Hardener 2.3 (compound A): the preparation was carried out analogously to the preparation of the hardener 1.3 with the difference that 2072.7 P of the precursor 2.1 were employed in place of 2126.2 P of the precursor 1.1.

(2b) Electrocoating and testing

As described under (1c), a coating bath was prepared, from the binder (1b) and the hardener (2a), which had the following characteristics:

pH: 6.7, conductivity: 1420 $\mu Scm^{-1}$, meq value: 37.

The deposition and hardening were carried out as in Example 1c), a smooth coating having a film thickness of 20 $\mu m$, a solvent resistance of more than 100 double strokes with methyl isobutyl ketone and a value of 60 cm in the Niessen reverse impact test was obtained.

We claim:

1. A hardening component for synthetic resins which contain groups which are capable of forming at least one of the group consisting of esters and amides with carboxylic acids, the hardening component comprising the produce (A) of the Michael addition of a compound (B), containing Michael addition-capable groups and ester groups, to a compound (C), which contains at least two Michael addition-capable double bonds, wherein the product (A) has an average of at least one polymerization-capable of double bond and at least two transesterification- or transamidation-capable ester groups per molecule and wherein the compound (B) represents a product of the reaction of (b1) CH-active alkyl esters of the formula X—$CH_2$—COOR wherein X is —COOR, —CN or $CH_3CO$— and R is alkyl of 1 to 8 carbon atoms and (b2) polyisocyanates with at least one mole of (b1) per isocyanate group and at least one (b1) per mole of compound (C).

2. A hardening component as claimed in claim 1, wherein compound (C) is an ester, an amide or a urea derivative of an α,β-olefinically unsaturated mono- or dicarboxylic acid.

3. A hardening component as claimed in claim 2, wherein the α,β-olefinically unsaturated acid is acrylic acid, methacrylic acid, dimethylacrylic acid, crotonic acid, maleic acid or fumaric acid.

4. A hardening component as claimed in claim 1, wherein the compound (C) is an ester of an α,β-olefinically unsaturated mono- or dicarboxylic acid with a polyol.

5. A hardening component as claimed in claim 4, wherein the compound (C) is an alkanediol diacrylate or dimethylacrylate, a trimethylolpropane triacrylate or trimethylacrylate or a pentaerythrite tetraacrylate or tetramethacrylate.

6. A hardening component as claimed in claim 1, wherein the compound C is a substituted urethane or a substituted urea of the general formula $$(Ac\text{—}E\text{—}D)_m\text{—}X_m \qquad (I)$$

in which
$X_m$ is the m-valent radical $R(NHCO)_m$ of a multifunctional isocyanate, where R represents an m-valent hydrocarbon radical which may be interrupted, if appropriate, by heteroatoms,
m is an integer of at least 2,
D denotes an aminoalkylene, O-alkylene, an aminocycloalkylene or an O-cycloalkylene radical,
E is an amido group or an oxygen atom, and
Ac is the acyl radical of an α,β-olefinically unsaturated mono- or dicarboxylic acid.

7. A hardening component as claimed in claim 6, wherein the group D in the formula (I) is a radical of the formula

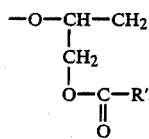  (II)

where R' is an alkyl radical, branched in the α-position to the carboxyl group, having 9–11 carbon atoms, and E in the formula (II) represents an oxygen atom.

8. A hardening component as claimed in claim 6, wherein the group D in the formula (I) is a radical derived from a 1,2-diol, and E is an oxygen atom.

9. A hardening component as claimed in claim 6, wherein the group D in the formula (I) has the structure $O(CH_2)_y\text{—}O\text{—}OC\text{—}(CH_2)_z\text{—}$, E is an oxygen atom, y is an integer from 1 to 4, and z is an integer from 5 to 20.

10. A hardening component as claimed in claim 1, wherein compound (C) is a mixed ester of an α,β-olefinically unsaturated dicarboxylic acid, a diol and the glycerol ester of a carboxylic acid, branched in the α-position, having 9–11 carbon atoms.

11. A hardening component as claimed in claim 1, wherein the compound (C) is an amide of the general formula $$R''(NHAc)_p \qquad (III)$$

in which R'' is the radical of a p-valent amine, Ac is the acyl radical of an α,β-olefinically unsaturated mono- or dicarboxylic acid, and p is an integer from 2 to 20.

12. A hardening component as claimed in claim 1, wherein the CH-active alkyl ester (b1) is an ester of malonic acid, acetoacetic acid, acetonedicarboxylic acid or cyanoacetic acid having 1–8 carbon atoms in the alkyl radical.

13. A hardening component as claimed in claim 1, wherein the CH-active alkyl ester (b1) is a methyl, ethyl, butyl or 2-ethylhexyl ester.

14. A hardening component as claimed in claim 1, wherein the polyisocyanate (b2) is an aliphatic or aromatic diisocyanate.

15. A hardening component as claimed in claim 11, comprising the product (A) of the Michael addition of 1 mole of the reaction product (B) to methylene bisacrylamide, toluylene bisacrylamide, hexamethylene bisacrylamide or isophorone bisacrylamide.

16. A hardening component as claimed in claim 6 wherein p is an integer from 2 to 10.

17. A hardening component as claimed in claim 9 wherein Y is 2, and z is an integer from 5 to 10.

18. A hardening component as claimed in claim 11 wherein p is an integer from 2 to 10.

* * * * *